(12) United States Patent
Zarges et al.

(10) Patent No.: US 6,613,104 B2
(45) Date of Patent: Sep. 2, 2003

(54) PROCESS FOR PREPARING DYES AND/OR BRIGHTENER FORMULATIONS

(75) Inventors: Wolfgang Zarges, Köln (DE); Rolf Brockmann, Bergisch Gladbach (DE); Erwin Bacher, Bergisch Gladbach (DE); Detlef Szeymies, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/757,808

(22) Filed: Jan. 10, 2001

(65) Prior Publication Data

US 2001/0049851 A1 Dec. 13, 2001

Related U.S. Application Data

(62) Division of application No. 09/399,248, filed on Sep. 20, 1999, now Pat. No. 6,241,786.

(30) Foreign Application Priority Data

Sep. 22, 1998 (DE) .......................................... 198 43 381
Jun. 16, 1999 (DE) .......................................... 199 27 398

(51) Int. Cl.[7] ................................................ B23Q 7/10
(52) U.S. Cl. ...................... 8/648; 252/301.23; 544/194
(58) Field of Search ........................ 8/648; 252/301.23; 544/194

(56) References Cited

U.S. PATENT DOCUMENTS

| | | | |
|---|---|---|---|
| 3,265,654 A | 8/1966 | Glabisch et al. | 260/29.6 |
| 4,689,048 A | 8/1987 | Fortsch et al. | 197/524 |
| 4,778,603 A | 10/1988 | Koll et al. | 278/650 |
| 4,810,390 A | 3/1989 | Flierl et al. | 263/650 |
| 4,838,895 A | 6/1989 | Galli et al. | 288/527 |
| 4,851,011 A | 7/1989 | Lacroix et al. | 287/527 |
| 4,865,744 A | 9/1989 | Härtling et al. | 302/651 |
| 5,516,901 A | 5/1996 | Dornhagen et al. | 602/133 |
| 5,565,102 A | 10/1996 | Brandt et al. | 652/500.28 |
| 6,120,561 A | 9/2000 | Wild et al. | 802/527 |
| 6,121,444 A | 9/2000 | Feldhues et al. | 544/193.2 |

FOREIGN PATENT DOCUMENTS

| | | | |
|---|---|---|---|
| CA | 2217911 | | 10/1998 |
| DE | 4401471 | | 7/1994 |
| GB | 2290803 | | 1/1996 |
| JP | 57-123262 | * | 7/1982 |

OTHER PUBLICATIONS

Hcaplus abstract 1983:35526 of JP 57123262, Jul. 1982.*

* cited by examiner

*Primary Examiner*—Margaret Einsmann
(74) *Attorney, Agent, or Firm*—Godfried R. Akorli; Diderico van Eyl

(57) ABSTRACT

The invention relates to optical brighteners that possess at least one free $SO_3H$ group and their use for whitening materials containing cellulose.

2 Claims, No Drawings

PROCESS FOR PREPARING DYES AND/OR BRIGHTENER FORMULATIONS

This application is a divisional of U.S. Ser. No. 09/399,248, filed Sep. 20, 1999 now U.S. Pat. No. 6,241,786.

The invention relates to processes for preparing dyes and/or brightener formulations.

EP-A-835 906 describes dispersions of optical brighteners having $SO_3H$ groups for whitening paper. Since the synthesis salts obtained when the brightener is prepared are very detrimental to the subsequent dissolution with sodium hydroxide, in terms of the maximum brightener concentration possible, the salt content must be kept as low as possible even in aqueous dispersions of optical brighteners having $SO_3H$ groups.

In EP-A-835 906 desalination takes place, for example, by washing the brightener presscake with demineralized water. Disadvantages of this procedure are on the one hand that a high product loss is suffered when the presscake is handled and on the other hand that only moderate and non-reproducible desalination conditions are present owing to the formation of channels in the presscake, as a result of which effective desalination is locally restricted.

A process has now been found by means of which it is possible to overcome the above-described disadvantages of the prior art.

The invention therefore provides a process for preparing formulations comprising dyes and/or brighteners which possess at least one free $SO_3H$ and/or COOH group, characterized in that an aqueous suspension comprising a) dyes and/or brighteners which possess at least one free $SO_3H$ and/or COOH group and
b) inorganic synthesis salts is desalinated using a microfiltration membrane having pore diameters of from 0.05 to 40 μm.

The dyes and/or brighteners having at least one free $SO_3H$ and/or COOH group can of course also be present together with their salt forms (for example alkali metal, alkaline earth metal or ammonium salts). It is preferred, however, if at least one dye and/or brightener is present in the form of its free acid to the extent of at least 90 mol-%.

The microfiltration membrane employed can be operated, for example, in the cross-flow mode.

For cross-flow membrane filtration it is preferred to employ microporous membranes as capillaries, tubes and in spiral-wound modular form. The membranes are produced, for example, from inorganic (e.g. $TiO_2$, $ZrO_2$, $Al_2O_3$) or organic materials (e.g. propylene or partly fluorinated or perfluorinated polymers, polysulphone, polyether sulphone), the pore diameters preferably being from 0.05 to 3.0 μm. A feature of the cross-flow mode is that the membranes are traversed tangentially by the product solution/suspension. In this context it is preferred to apply transmembrane pressures of from 1 to 10 bar. It is likewise preferred to conduct a periodic backwash from the permeate side in order to maintain high permeate performances.

The process of the invention operates with particular advantage if the pH of the suspension to be desalinated is from 1 to 6, in particular from 2 to 5.

It is likewise advantageous if the acid form ($SO_3H$ and/or COOH) of the dye or brightener has a water solubility of less than 5 g/l, preferably less than 1 g/l under the respective process conditions.

The process of the invention is preferably used to desalinate $SO_3H$-containing dyes and/or brighteners, especially brighteners.

The preferred amount of dye and/or brightener in the aqueous suspension to be desalinated is from 100 to 500 g/l, in particular from 150 to 400 g/l of aqueous suspension to be desalinated. At the same time the inorganic salt content in the suspension prior to desalination is generally from 1 to 25, preferably from 2 to 8% by weight, based on the suspension. The inorganic salt content to be established preferably, by means of the process of the invention, is <1% by weight, in particular less than 0.5% by weight. The inorganic synthesis salt preferably comprises alkali metal halides, sulphates or hydrogen sulphates.

The desalination of the invention takes place preferably at a temperature from 25 to 70° C., in particular at from 30 to 50° C.

The desalination can be operated with concentration or as diafiltration. In the case of diafiltration, the permeate formed is replaced continuously by demineralized water.

Optical brighteners employed in connection with the process of the invention are with particular preference those of the formulae (I), (II) and/or (III):

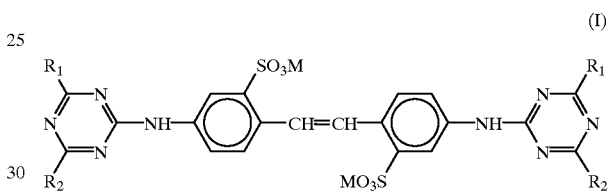

in which

M represents H, $R_1$ and $R_2$ independently of one another denote —$NH_2$, —$NHCH_3$, —$NHC_2H_5$, —$N(CH_3)_2$, —$N(C_2H_5)_2$, —$NHCH_2CH_2OH$, —$NHCH_2CH_2CH_2OH$, —$N(CH_2CH_2OH)_2$, —$N(CH_2CH_2CH_2OH)_2$, —$N(CH_3)(CH_2CH_2OH)$, —$NHCH_2CH_2OCH_2CH_2OH$, —$NHCH_2CH_2CH_2SO_3M$, —OH, —$OCH_3$, —$OCH(CH_3)_2$, —$OCH_2CH_2OCH_3$,

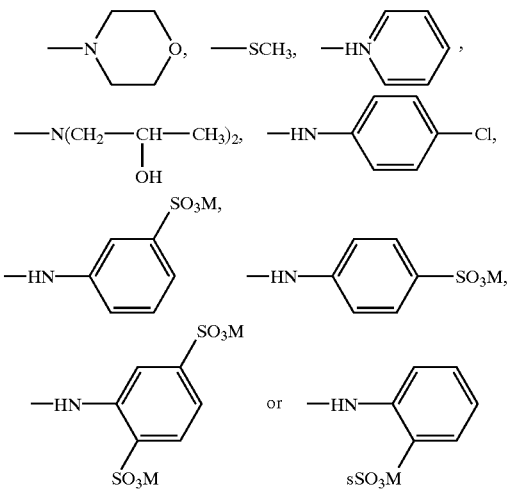

in which

M is as defined;

or of the formula

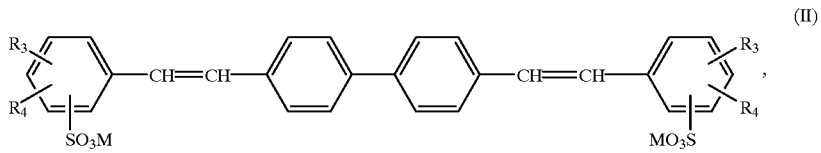

in which
- $R_3$ is hydrogen, alkyl of 1 to 4 carbon atoms, alkoxy of 1 to 4 carbon atoms, halogen or $SO_3M$, and
- $R_4$ is hydrogen or alkyl having 1 to 4 carbon atoms and
- M is as defined;

and also the formula

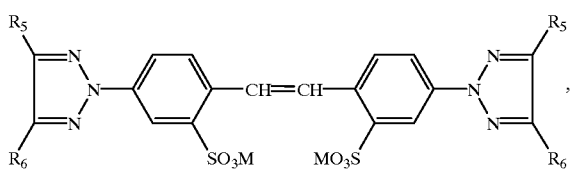

in which
- M is as defined and
- $R_5$ and $R_6$ independently of one another denote hydrogen, $CH_3$,

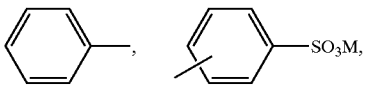

or
- $R_5$ and $R_6$ together complete a benzene ring.

Very particular preference is given to such brighteners of the formula (I), especially those of the formula (Ia)

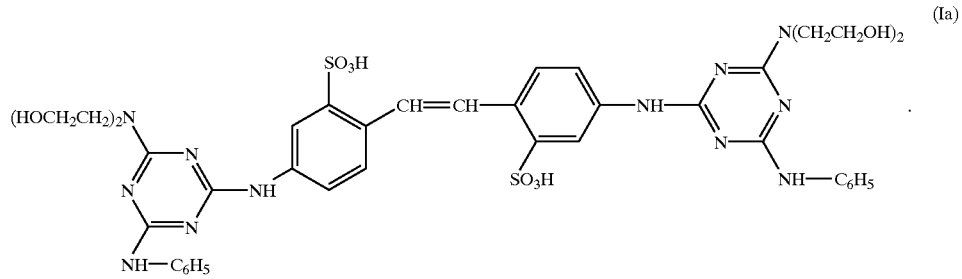

It is likewise advantageous to append to the process of the invention a concentration by means, for example, of membrane dewatering.

Prior to, during or after the process of the invention it is possible if desired to adjust the particle size of the dye dispersion or brightener dispersion by means of a wet comminution technique, such as, for example, Cavitron milling, jet disperser technology, beadmilling, etc.

The dye dispersions and/or brightener dispersions obtained in accordance with the process of the invention can be mixed and/or homogenized, for example following the addition of further additives such as polyvinylpyrrolidone, commercially customary anionic dispersants, for example formaldehyde-naphthalenesulphonic acid condensates or other condensation products of aromatic sulphonic acids and formaldehydes, or starch degradation products, such as anionic polyhydroxy compounds, for example, preferably xanthan, and can then be used for dyeing or whitening paper pulps in papermaking and for whitening or dyeing the coating slips which are commonly used in the paper industry, the latter being unpigmented or, preferably, pigmented pulps and slips.

Reducing agents and preservatives may also be mentioned as further additives, however.

Brighteners are preferably applied by three methods in papermaking:

Pulp: This is the cellulose suspension before the paper is made. Here it is preferred to employ the brighteners having 2 sulpho groups.

Coating slip, coating: Here, a coating is applied to the finished paper after the drying section. In addition to optical brighteners, preferably those having 6 sulpho groups, the coating slip comprises, inter alia, pigments (chalk, clay), latex binders, cobinders and dispersants.

Size press: After the drying section, paper which is almost finished runs through the size press, which may consist, for example, of counterrotating rolls, which in turn run through a sump containing starch and optical brightener. Alternatively, the application can be made via a padder or by spraying, preferably followed by a drying section.

For the application of the dye dispersions and/or brightener dispersions prepared in accordance with the process of the invention, an alkaline pH is advantageous for unhindered dissolution. In the case of coating slips, this pH should in particular lie within the range from 8 to 11, and in the pulp should in particular be from 7.5 to 9. The desired pH can be established, for example, by adding NaOH, in which case this pH is preferably established in the fiber dispersion or in the coating slip prior to the addition of the brightener dispersion. When using alkaline fillers, such as precipitated or natural calcium carbonate, it is possible to dispense with the addition of alkali.

It is possible to improve not only the preparation of $SO_3H$— and/or COOH-containing dyes and brightener formulations but also the preparation of their salts, especially their aqueous solutions.

At the end of the synthesis, water-soluble organic dyes and brighteners are generally obtained in the form of dilute aqueous solutions which are contaminated with by-products and which also still contain, depending on the synthesis, inorganic salts, examples being alkali metal chlorides and sulphates. In order to produce ready-to-sell preparations from such crude solutions, they must be concentrated and freed as far as possible from salts and by-products. A high salt content has an adverse effect above all on the durability of liquid formulations, while by-products, which often also possess an intrinsic colour, may lead to a shift in shade. Membrane techniques for purifying such dye salts and brightener salts have already been disclosed. It is common to operate with solutions, i.e. in comparatively low concentrations, using preferably membranes having a sufficient retention for the dissolved species (UF, NF). Ultrafiltration (UF) and nanofiltration (NF) membranes require operating pressures of more than 10 bar and so entail high operating costs. EP-A 197 006 has already described processes for purifying such dye suspensions and brightener suspensions. The disadvantage: a two-stage membrane technique is operated, with different MWCOs. The high residual solubilities of the alkali metal salts employed (anionic dyes/brighteners) make it indispensable to use UF+NF membranes, with the disadvantages described above.

The object of the present invention is to improve the existing separation techniques. The aim is above all to achieve a high through-flow rate at low operating pressures, improved desalination performance, and, in general terms, high operational reliability.

The invention therefore additionally provides a process for preparing formulations of anionic dyes and/or brighteners which possess at least one group $SO_3M$ and/or COOM in which M denotes alkali metal or ammonium, characterized in that i) an aqueous suspension comprising
   a) dyes and/or brighteners which possess at least one free $SO_3H$ and/or COOH group and
   b) inorganic synthesis salts is desalinated using a microfiltration membrane having pore diameters of from 0.05 to 40 $\mu$m and
ii) following the desalination, the suspended dye and/or brightener is dissolved by adding alkali metal or ammonium hydroxide, carbonate and/or hydrogen carbonate, and/or amines, and
iii) the dye solution and/or brightener solution obtained in accordance with ii), directly or following the addition of further additives, especially solvents, is freed from colloidal and/or insoluble constituents using a microfiltration membrane having pore diameters of from 0.05 to 40 $\mu$m.

For substep i) of this process the ranges of preference are the same as for the process of the invention for preparing $SO_3H$— and/or COOH-containing dyes and/or brighteners.

For substep ii) of the process of the invention it is preferred to use NaOH, LiOH, KOH, $K_2CO_3$, $Na_2CO_3$, $NR_1R_2R_3R_4OH$, $NR_1R_2R_3$, where $R_1$, $R_2$, $R_3$ and $R_4$ independently of one another denote H, alkyl, aryl (optionally substituted) in order to dissolve the dispersed dye and/or brightener. Preference is given to KOH, LiOH, $N(CH_3)_4OH$, $H_2NCH_2CH_2OH$, $HN(CH_2CH_2OH)_2$ and $H_2NCH_2CH_2NHCH_2CH_2OH$.

In substep ii) it is possible if desired to add one or more solubilizers such as, for example, $\epsilon$-caprolactam, urea, triethylene glycol, polyethylene glycol, propanediol, 1-ethoxy-2-propanol and/or diethylene glycol. For the choice of the base(s) employed it is possible to determine the counterion for the anionic dye and/or brightener.

For substep iii) of the process of the invention the microfiltration membranes employed are preferably those as have already been described above. The membranes used in substeps i) and iii) are independent of one another. They can be identical but need not be so. It is therefore entirely possible to employ a different membrane material and/or a different modular form than for substep i). Preferably, however, the membranes employed for substep iii) possess pore sizes which are greater than the size of the anionic optical brightener and/or dyes, or the solution aggregates thereof. Substep iii) is preferably operated as a dead-end filtration.

"Dead-end" mode means that the membrane or membrane filter is not traversed tangentially during most of the permeation period. For example, cross-flow apparatuses can be utilized in the manner indicated if the retentate side is completely closed and is opened only for brief periods in order to discharge retained particles.

Colloid and/or insoluble constituents are preferably separated off at a temperature of from 40 to 100° C., preferably at from 50 to 80° C.

By an appropriate choice of membrane for substep iii), preferably with pore diameters <0.2 $\mu$m, this filtration can also be carried out as a sterile filtration.

The dye solution or brightener solution obtained after substep iii) of the process of the invention can be dried to a solid (powder or granular) dye or brightener preparation by removal of water, optionally following the addition of formulation auxiliaries, or can be used further as a stable liquid formulation, optionally following the addition of formulation auxiliaries such as solubilizers (urea, urea derivatives, glycols, polyglycols, alkanolamines, lactams such as $\epsilon$-caprolactam, etc.).

The invention further relates to the brightener of the formula Ia as the bis-$^{\oplus}N(CH_3)_4$ salt (Ib) and as the bis-$^{\oplus}H_2N(CH_2CH_2OH)_2$ salt (Ic).

The invention additionally relates to the use of the brightener of formula Ia as the bis-$^{\oplus}H_3NCH_2CH_2OH$ salt (Id) and as the bis-$H_3^{\oplus}NCH_2CH_2NHCH_2CH_2OH$ salt (Ie) for whitening materials containing cellulose, especially paper.

The brightener salts Ib and Ic of the invention, and also the brightener salts Id and Ie used in accordance with the invention, are suitable for whitening paper pulps in papermaking, examples being cellulose, wood pulp (chemical and mechanical pulp) and for whitening the coating slips commonly used in the paper industry, specifically for whitening unpigmented or, in particular, pigmented pulps and slips.

The known coating slips comprise as binders, inter alia, polymer dispersions based on copolymers of butadiene-styrene, acrylonitrile-butadiene-styrene, acrylates, ethylene-vinyl chloride or ethylene vinyl acetate, or based on homopolymners, such as polyvinyl chloride, polyvinylidene chloride, polyethylene, polyvinyl acetate or polyurethanes. A preferred binder consists of styrene-butyl acrylate or styrene-butadiene-acrylic acid copolymers. Further polymer latices are described, for example, in U.S. Pat. No. 3,265, 654.

The coating slips are commonly pigmented using aluminium silicates, such as china clay and kaolin, and also barium sulphate, satin white, titanium dioxide or calcium carbonate (chalk).

The coating slips of the invention contain preferably from 5 to 70% by weight of a white pigment. The binder is preferably used in an amount which is sufficient for the dry content of polymeric compound to be from 1 to 30% by weight, preferably from 5 to 25% by weight of the white pigment. The amount of the brightener dispersion of the invention is calculated such that the brightener is present in amounts of from 0.005 to 1% by weight, in particular from 0.01 to 0.55% by weight, based on white pigment.

The coating slip of the invention can be prepared by mixing the components in whatever order at temperatures from 10 to 100° C., preferably from 20 to 80° C. The components here also include the customary auxiliaries which can be used to regulate the rheological properties, such as viscosity or water retention capacity, of the coating slips. Examples of such auxiliaries are natural binders, such as starch, casein, protein or gelatine, cellulose ethers, such as carboxyalkylcellulose or hydroxyalkylcellulose, algic acid, alginates, polyethylene oxide or polyethylene oxide alkyl ethers, copolymers of ethylene oxide and propylene oxide, polyvinyl alcohol, polyvinylpyrrolidone, water-soluble condensation products of formaldehyde with urea or melamine, polyphosphates or polyacrykic salts.

The brighteners of the formula Ib, Ic, Id and Ie to be used in accordance with the invention are incorporated either into the finished coating slip or into one of the components of the coating slip.

The coating slip of the invention can be used for coating paper, wood, films, such as cellulose, cellulose triacetate, textile materials, etc. Particular preference is given to its application to paper and cardboard and also photographic papers.

The coating slip can be applied to the substrate by any conventional technique: for example, using an air knife, a spreading knife, a brush, a roller, a doctor blade or a rod, after which the coating is dried, using for example an infrared dryer and/or hot-air dryer, at temperatures of the substrate surface in the range from 70 to 200° C., preferably from 90 to 130° C., down to a residual moisture content of from 3 to 6% by weight.

For the use of the coating slips of the invention, the coatings obtained feature optimum distribution of the optical brighteners over the entire surface and, consequently, an increase in whiteness and also high light fastness.

EXAMPLES

Example 1

In each case 30 kg of a synthesis suspension of a disulpho optical brightener of the formula (Ia) having a dry matter content of 13% and a sodium chloride content of 5.5% are concentrated and desalinated on a microfiltration unit at a pH of from 3 to 4.5. Polymer membranes made from polyvinylidene fluoride (PVDF) are used, as tubular modules having a diameter of ½". The membrane has a pore width of 0.1 μm, the module an area of 0.3 m$^2$.
Desalination/Concentration Beginning at 20° C. and a module entry pressure of 5 bar, 15 kg of permeate are taken off first of all before diafiltration is conducted by taking off 60 kg of permeate and continuously adding 60 kg of demineralized water. In the course of this diafiltration, the operating temperature is raised to 40° C.

Final concentration is carried out by removing 8 kg of permeate. The retentate has a dry matter content of 33%. The residual NaCl content is about 0.1%.
Clarifying Filtration Following the end of desalination and concentration, the pressure is reduced to 0 bar. Subsequently, 10% by weight of diethylene glycol and 3% of diethanolamine are added. The suspension is heated to 55° C. and dissolved by adding a) Potassium hydroxide solution at a pH of 9.5. The transmembrane pressure is then raised to 10 bar and the permeate obtained is the clear brightener solution. Following standardization (addition of demineralized water until a 1% solution in water has an extinction of 135; path length 1 cm, wavelength 340 nm) the result is a highly concentrated liquid formulation which shows no instances of precipitation, etc., even after storage for 5 months at RT and 0° C.

b) Sodium hydroxide solution at a pH of 9.5. The transmembrane pressure is then raised to 10 bar and the permeate obtained is the clear brightener solution. Following standardization the result is a liquid formulation from which first crystals of product deposit after storage for 3 months at 0°C.

c) Lithium hydroxide at a pH of 9.5. The transmembrane pressure is then raised to 10 bar and the permeate obtained is the clear brightener solution. Following standardization the result is a liquid formulation from which first crystals of product deposit after only a week at room temperature.

Example 2

30 kg of a synthesis suspension of the disulpho optical brightener of the formula Ia having a dry matter content of 14% and a sodium chloride content of 4.5% are concentrated and desalinated on a microfiltration unit at a pH of from 3 to 4.5. A ceramic capillary module is used, having a channel height of 4 mm, a membrane surface area of 0.059 m$^2$ and a pore width of 0.5 μm.
Desalination/Concentration At 25–30° C. and a module entry pressure of 2.0 bar, 18 kg of permeate are taken off first of all before diafiltration is conducted by taking off 30 kg of permeate and continuously adding 30 kg of demineralized water. Final concentration is carried out by removing 3 kg of permeate. The retentate has a dry matter content of 29%. The residual NaCl content is about 0.2%.
Clarifying Filtration Following the end of desalination and concentration, the pressure is reduced to 0 bar. Subsequently, 10% by weight of triethylene glycol and 3% of triethanolamine are added. The suspension is heated to 60° C. and dissolved by adding potassium hydroxide solution at a pH of 9. The transmembrane pressure is then raised to 3 bar and the permeate obtained is the clear brightener solution. Following standardization, the result is a storage-stable highly concentrated liquid formulation.

Example 3

12 kg of the same brightener suspension as in Example 2 are treated using a tubular module of polypropylene having a membrane surface area of 0.036 m$^2$ and a pore width of 0.2 μm. In contradistinction to Example 2, the module is periodically backwashed with permeate.
Desalination/Concentration 30° C. and a module entry pressure of 2.0 bar, 5 kg of permeate are taken off first of all before diafiltration is conducted by taking off 21 kg of permeate and continuously adding 21 kg of demineralized water. Final concentration is carried out by removing 2 kg of permeate. The retentate has a dry matter content of 27%. The residual NaCl content is about 0.1%. The specific permeate flow here, at about 400 kg(m$^2$h), is about twice as high as in the first example.
Clarifying Filtration Following the end of desalination and concentration, the transmembrane pressure is reduced to 0 bar. Subsequently, 10% by weight of triethylene glycol are added. The suspension is heated to 50° C. and largely dissolved by adding potassium hydroxide solution at a pH of 9. The transmembrane pressure is then raised to 3 bar and the permeate obtained is the clear brightener solution. Following standardization, the result is a storage-stable highly concentrated liquid formulation.

Example 4

The retentate from Example 3 is heated to 55° C. after the end of desalination and concentration, and is substantially dissolved by adding tetranethylammonium hydroxide at a pH of 9.4. Clarifying filtration through a 1.2 μm membrane filter in dead-end operation gives a clear solution which has an extraordinarily good storage stability in comparison to the corresponding alkali metal salt formulations (comparable foreign electrolyte content).

Example 5

The retentate from Example 3 is heated to 55° C., after the end of desalination and concentration, and is substantially dissolved by adding ethanolamine at a pH of 8.7. A clarifying filtration through a 1.2 μm membrane filter in dead-end operation separates off a few insoluble constituents. The clear solution has a good stability on storage which is comparable with that of Example 4.

Example 6

The retentate from Example 3 is admixed with 20% of diethylene glycol following the end of desalination and concentration and is substantially dissolved at room temperature by adding 2-(2-aminoethylamino)ethanol at a pH of 9.5. A clarifying filtration through a 5 μm membrane filter in dead-end operation separates off insoluble constituents. The clear solution has excellent storage stability.

Example 7

A solution virtually free of foreign salt, comprising the lithium/sodium mixed salt (molar ratio about 1:1) of the phthalocyanine dye Direct Blue 199, is admixed with sulphuric acid to a pH of 1.0. The suspension is then desalinated twice by diafiltration using a tubular membrane having a pore width of about 50 nm.

Direct Blue 199 has the formula

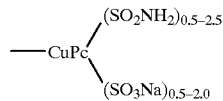

The corresponding ethanolammonium salts were obtained analogously by using the following ethanolamines in place of LiOH:

6a: $H_2N\ CH_2CH_2OH$

6b: $HN\ (CH_2CH_2OH)_2$

6c: $N\ (CH_2CH_2OH)_3$

The dye salts of Example 6 are outstandingly suitable for dyeing and printing paper, especially for printing by the ink-jet method.

What is claimed is:

1. A compound of the formula

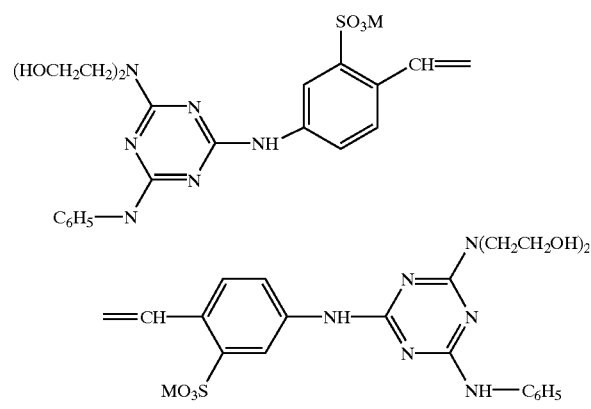

wherein M represents $H_2^{\oplus}N(CH_2CH_2OH)_2$.

2. A method for whitening materials containing cellulose comprising applying to said materials a compound of the formula

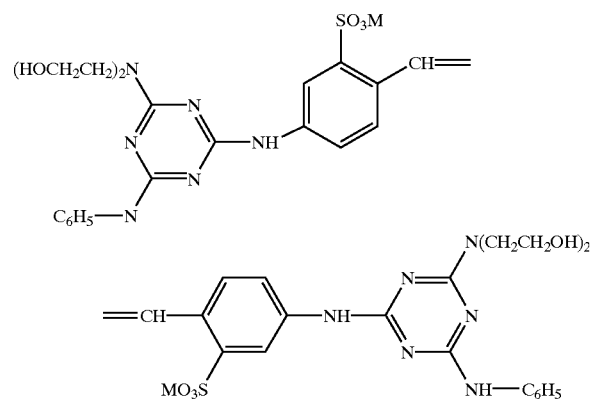

wherein M represents $H_2^{\oplus}N(CH_2CH_2OH)_2$, $H_3^{\oplus}NCH_2CH_2OH$, and/or $H_3^{\oplus}NCH_2CH_2NHCH_2CH_2OH$.

* * * * *